United States Patent
Anslow et al.

(10) Patent No.: US 7,606,487 B1
(45) Date of Patent: Oct. 20, 2009

(54) DISTORTION MEASUREMENT IN OPTICAL COMMUNICATION SYSTEMS

(75) Inventors: Peter J Anslow, Bishops Stortford (GB); Richard W Heath, Harlow (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1455 days.

(21) Appl. No.: 09/973,650

(22) Filed: Oct. 9, 2001

(51) Int. Cl.
*H04B 10/08* (2006.01)

(52) U.S. Cl. .............................. 398/27; 398/25; 398/26; 398/33; 398/177; 398/154; 398/155; 398/202; 398/208; 375/224; 375/317; 375/341; 714/704; 714/705

(58) Field of Classification Search .................... 398/26, 398/154, 25, 27, 155, 202, 177, 208, 33; 375/224, 317, 341; 714/704, 705
See application file for complete search history.

(56) References Cited

U.S. PATENT DOCUMENTS 5,325,397 A * 6/1994 Scholz et al. ................ 375/224
5,585,954 A * 12/1996 Taga et al. ..................... 398/26
5,815,294 A    9/1998 Ishikawa et al.

FOREIGN PATENT DOCUMENTS

WO    WO 00/18047    3/2000
WO    WO 01/65733    9/2001

* cited by examiner

*Primary Examiner*—Hanh Phan
(74) *Attorney, Agent, or Firm*—Kent Daniels; Blake, Cassels & Graydon LLP

(57) ABSTRACT

The distortion component of an optical signal received from an optical transmission system, such as an all-optical system, subject to noise and amplitude distortion components, can be evaluated by a method that utilises information derived from analysing the bit error ratio (BER) of the signal as a function of a movable threshold. The analysis is performed in high and low bit error ratio areas of the eye diagram used for data one/zero decision making. The intersections with the threshold axis (where BER=0.25) of extrapolations of the high and low bit error ratio values provide variables V1 and V2 which are divided (V1/V2) to obtain an estimate/prediction of the amplitude closure of the eye diagram resulting from amplitude distortion. The analysis is preferably carried out after Q conversion of the BER values. The method can also be extended to provide indications of Q, bit error ratio and optical signal-to-noise ratio within the signal.

19 Claims, 5 Drawing Sheets

DISTORTION MEASUREMENT IN OPTICAL COMMUNICATION SYSTEMS

FIELD OF THE INVENTION

This invention relates to a method for estimating the distortion component of a signal in an optical transmission link or network. In particular, the invention relates to a technique for separating the distortion component from noise impairment in an optical transmission link or network. More particularly, the invention provides a technique for estimating distortion from Q-measurement.

BACKGROUND TO THE INVENTION

As in all transmission links, distortion of the transmitted signal is an inevitable consequence of transmission over an imperfect transmission medium and its associated circuitry and other terminating components. In electrical transmission systems, it has long been the case that various forms of compensation, or equalisation, have to be performed on the transmitted signal. In the case of post transmission equalisation, equalisation is carried out at the receiver or at a number of intermediate repeater stations. Alternatively, in the case of pre-equalisation, the signal is pre-distorted at the transmitter in the opposite sense from that encountered over the transmission link. To a large extent, the same philosophy has been carried over into the field of optical transmission. However, the types of distortion met by optical signals are different from their electric counterparts because of the nature of the transmission signal and the medium through which it is carried.

The definitive measure of signal quality in a network is normally the bit error ratio (BER). Where a customer requires a BER in the region of $1\times10^{-12}$, however, verification of the BER by direct measurement can take an unacceptable time period, even with a high speed network having a data rate of $1\times10^{10}$ bits per second (bps). The traditional way of detecting errors is to establish a ones/zeroes decision threshold in the centre of the "eye diagram" ('eye') of a transmission link and monitor the data until an error is detected. The period within which an error is detected then depends on the BER and the signal bit rate. In extreme cases, it could take centuries before an error is detected! This technique can be improved by moving the decision threshold up or down within the eye into an area where the bit error ratio is higher and therefore easier to measure within a given time period. By evaluating the measured BER at several different thresholds, an assessment of how quickly the error ratio rolls off as the threshold is moved from the outer edges of the eye towards the centre can be made, for the one and zero levels separately.

FIG. 1 represents a plot of the BER against position of the decision threshold between data zero and data one. The figure shows that the roll off for ones and zeroes are not necessarily the same. At the extremities of the plot, errors can be detected but as the threshold is moved towards the centre of the eye, a position is reached where errors cannot be detected in an acceptable time. At this point, measurements are stopped, marked by the abrupt ends of the solid lines. The absolute minimum BER will occur at a decision threshold where the trends in error ratio on the one and zero levels produce the same BER value. So, by extrapolating the trend lines from the measured data to a point where they cross, as indicated by the dotted lines in FIG. 1, it is possible to estimate the actual minimum BER (min BER) without measuring it directly.

An alternative way of presenting the same information is shown in FIG. 2, where the Q value is plotted against the threshold, using the standard conversion equation known in the art:

$$Q = 2^{1/2} \mathit{erfc}^{-1}(4 \times \mathrm{BER})$$

where erfc is the complementary error function, as know in the art.

The curved lines of FIG. 1 become straight in FIG. 2, as a result of this conversion, and it is therefore easier to extrapolate to estimate the error ratios rather than having to fit to curves. In addition, the use of Q values, in combination with the straight lines, makes it more intuitive rather than an exercise on line fitting, as is the case for FIG. 1.

One of the key requirements of the network is to assess what is happening to the signal, for example, whether factors such as the levels of noise, distortion, power etc are within expected limits. The above technique is powerful since it enables the network operator to predict error ratios in a context where actual measurement periods would be completely unacceptable.

SUMMARY OF THE INVENTION

The invention provides, in one aspect, a method of measuring the amplitude distortion component in an optical transmission signal subject to noise and amplitude distortion components, the method comprising determining the amplitude distortion component by analysing the bit error ratio (BER) of the signal as a function of a movable decision threshold.

The analysis is preferably performed in a high bit error ratio area and in a low bit error ratio area. The analysis is preferably performed on values of BER after Q conversion in accordance with the function $Q=2^{1/2}\mathit{erfc}^{-1}(4\times\mathrm{BER})$, in which erfc is the complementary error function.

The analysis preferably comprises determining BER values as a function of the position of the movable decision threshold in the high bit error ratio area and in the low bit error ratio area; extrapolating the BER values in both the high bit error ratio area and the low bit error ratio area to obtain respective first and second decision threshold values corresponding to a predetermined value of BER in both the high bit error ratio area and the low bit error ratio area; determining the difference V1 between the first and second decision threshold values in the low bit error ratio area; determining the difference V2 between the first and second decision threshold values in the high bit error ratio area; and determining the ratio V1/V2 as a measure of the amplitude distortion component of the signal.

The method may comprise further steps for estimating a second bit error ratio from which to estimate the optical signal to noise ratio.

The invention also provides a computer program adapted to perform the method, a carrier on which is stored a program adapted to perform the method, an optical transmission system incorporating a processor programmed to perform the method, an optical receiver adapted to perform the method, a computer programmed to perform the method, an optical transmission system incorporating a processor adapted to operate in response to the carrier, and an optical signal received by an optical receiver adapted to perform the method.

BRIEF DESCRIPTION OF THE DRAWINGS

Embodiments of the invention will now be described with reference to the following drawings, in which.

DETAILED DESCRIPTION OF THE ILLUSTRATED EMBODIMENTS

Figure 1:
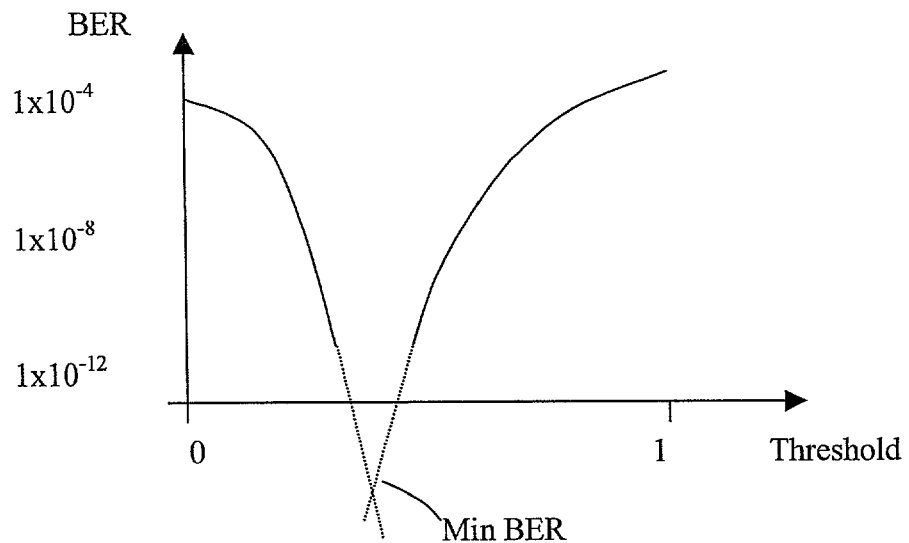
FIG. 1 is an illustrative plot of bit error ratio versus decision threshold.
Figure 2:
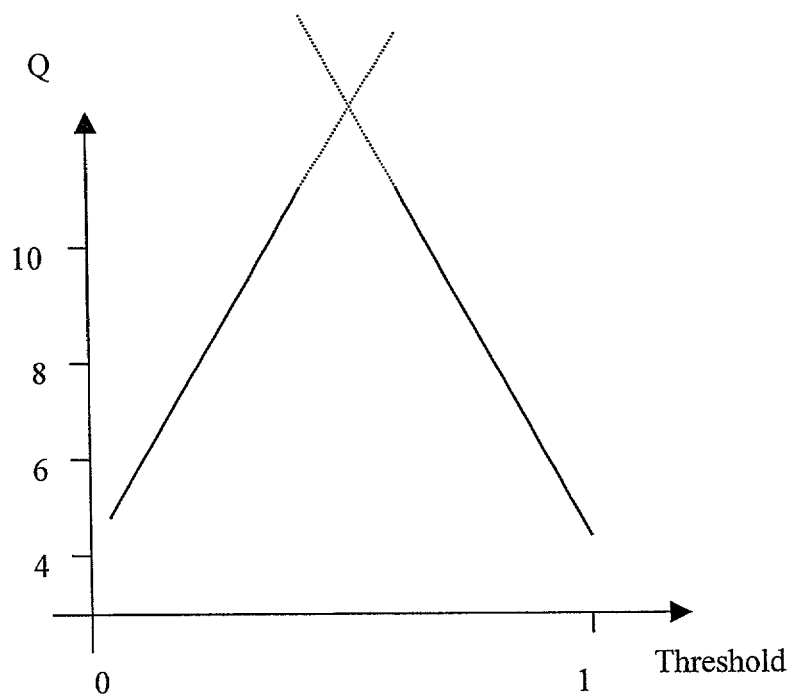
FIG. 2 is a plot corresponding to FIG. 1 but after conversion.

Applying the technique described above to a "signal" that is degraded only by noise, leads to a plot similar to that shown in FIG. 2. In this case, however, the Q values plotted typically extend from 2 to 6. The cut-off at Q=6 is because that is the normal level beyond which it is not feasible to continue measurement in a reasonable period of time. As before, the two straight lines can readily be extrapolated to determine, or estimate, the BER. This technique is described in the literature as the "swept decision method". If this technique were applied to a real signal coming through the network, that is, a signal suffering from degradation due to both noise and distortion, the plot becomes more like that shown in FIG. 4, having changing slope as the decision threshold moves toward the centre of the eye, and this is more difficult to interpret.

Figure 3:
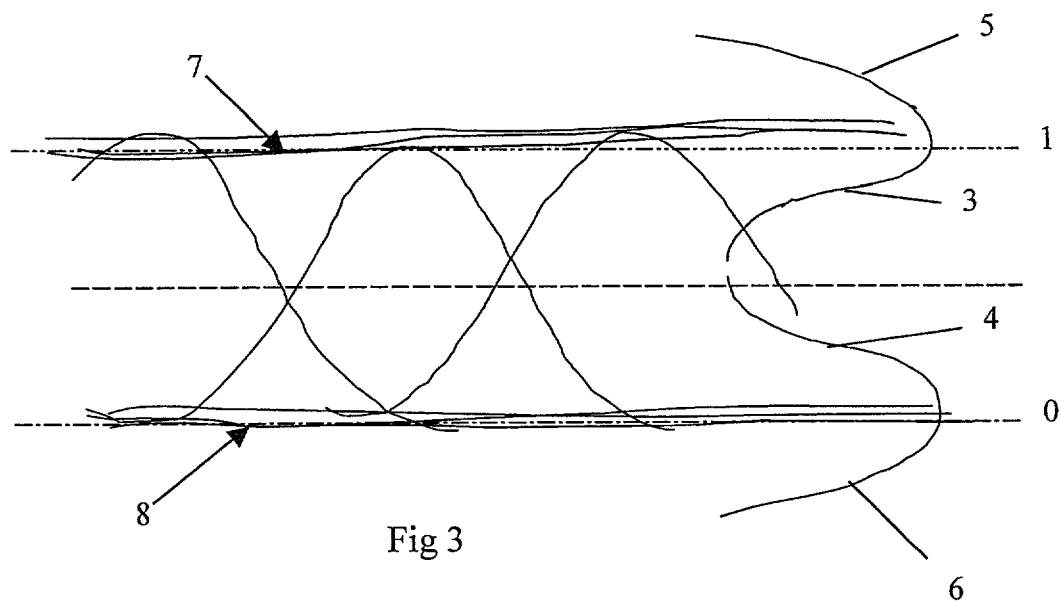
FIG. 3 is a typical "eye diagram" showing Gaussian distribution of error probabilities around the data one and zero thresholds.

This arises because the technique effectively explores the roll off in BER as the threshold is swept from the outside of the eye, inwards. For a signal affected by noise only, the roll off follows the innermost tails 3, 4 of the Gaussian or Normal probability distribution of the noise, shown by curves 5, 6 in FIG. 3, centred on the noise free data ones and data zeros (illustrated by broken lines 1, 0) of the eyes. However, when distortion is present as well as noise, e.g. through cross-talk or pulse "smearing" due to dispersion, the result is that there are multiple tracks 7, 8 appearing in the eye diagram on both one and zero levels, and the curves 5,6 near the levels of the ones and zeroes become distorted themselves. The BER roll off is more gradual than with the noise only case. Further in to the eye and away from the distortion effects, the innermost tails of the curves 5, 6 still represent the true Gaussian distribution of the noise, so the BER roll off becomes the same as with the signal only affected by noise.

Figure 4:
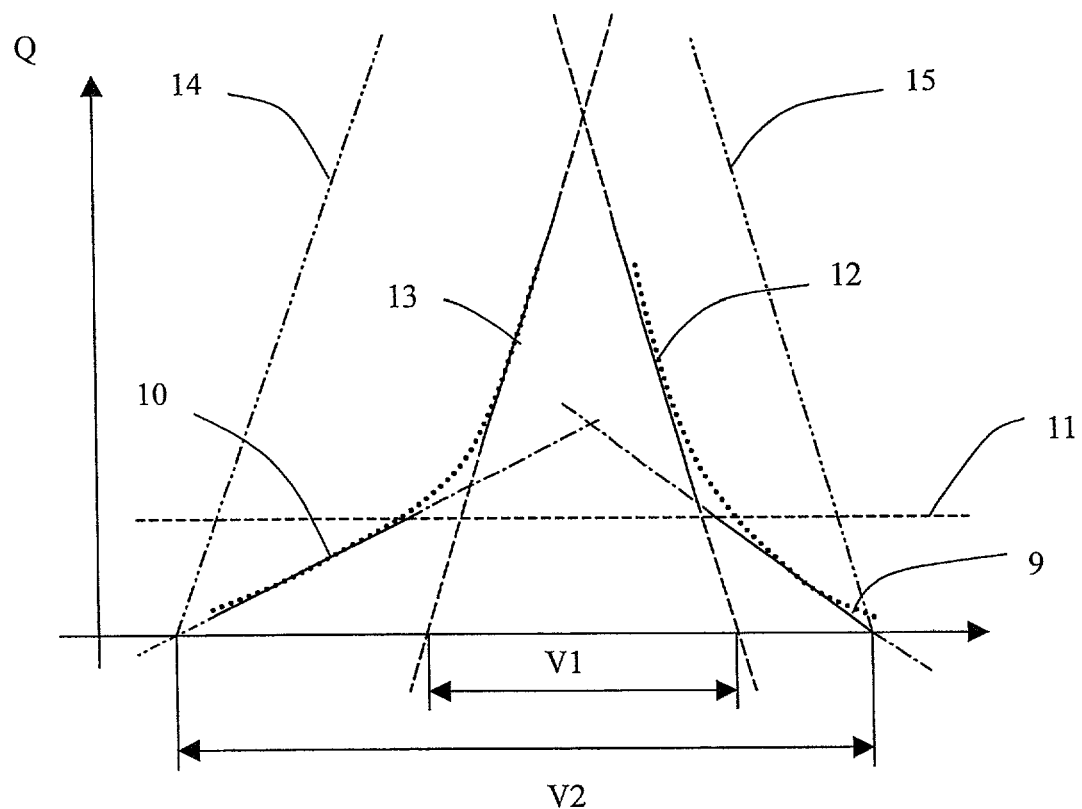
FIG. 4 is a plot illustrating the principles of the invention.

This translates into a plot, as schematically illustrated in FIG. 4, where the curve can be approximated by straight lines 9, 10 that exhibit a shallower slope in the region below the broken line 11, at the outer edges of the eye where there is both distortion and noise, and lines 12, 13 with a steeper slope in the region above the broken line 11 near the centre of the eye where there is noise only.

Hitherto, the swept decision method has been carried out by ignoring the shallower sloped lines 9, 10, ie everything below the line 11 in FIG. 4, and extrapolating only the steeper lines 12, 13. In other words, the component containing noise and distortion is disregarded, using the philosophy that it is the data nearest the centre of the eye that is the most important, because that is where the tail is the "true" tail, knowing that when data is being explored that is following the correct distribution, the line is straight. In other words, when the lines become straight, it is an indication of the portion of the data that is following the true noise distribution. These lines are then extrapolated, as before.

In accordance with the invention, the normally disregarded, shallow lines are used to make a second line fit that can provide further information. In its simplest terms, the invention requires Q measurements to be taken in the high error ratio part of the curve and straight lines to be fitted to this part and to the part with the low error ratio data The steeper lines 12, 13 are extrapolated back to intersect the horizontal axis and the distance between the points of intersection is allocated the value V1. These intersections represent the inner set of levels in the eye diagram, arising from the distortion elements of the signal. It addresses the question, if the signal had no distortion, by how much would the eye amplitude have to be reduced to get the same Q with the same amount of noise actually present? In contrast, the points where the shallow slope lines 9, 10 intersect the horizontal axis corresponds to an error ratio of one quarter (0.25) when the threshold is located in the outer edges of the eye diagram. This corresponds to the true one/zero level. The distance between the outer points of intersection is allocated the value V2. The ratio V1/V2 then represents the amount by which the eye is distorted, i.e. the amplitude closure ratio of the eye.

From this single measurement, it is possible to obtain not only a prediction of the bit error ratio at a level that could not otherwise have been measured, but also the closure ratio. The importance of this is that changes in the bit error ratio of the received signal analysed according to the present method can be differentiated as between noise-induced changes and distortion-induced changes. This information can be of immense benefit in determining what is happening in the network overall.

The invention can also address the question, if there were no distortion but there was a given level of noise, what would be the Q value? This question is answered by notionally moving the points of intersection of the steep, inner lines 12, 13 with the horizontal axis out to the points of intersection of the outer lines 9, 10 with the horizontal axis and redrawing the lines, as shown by the broken lines 14, 15. The 'noise-only' Q value is measured at the point where these new lines 14, 15 cross (not visible in the drawing).

This value of Q then represents the Q value if there were no distortion. This also gives a prediction of the optical signal-to-noise ratio, since the well understood mapping between Q and the optical signal-to-noise ratio becomes valid in the absence of distortion effects. Conventional methods for determining the optical signal-to-noise ratio in a network are becoming increasingly challenged by the increasing numbers of channels being handled by current (and future) networks.

Figure 5:
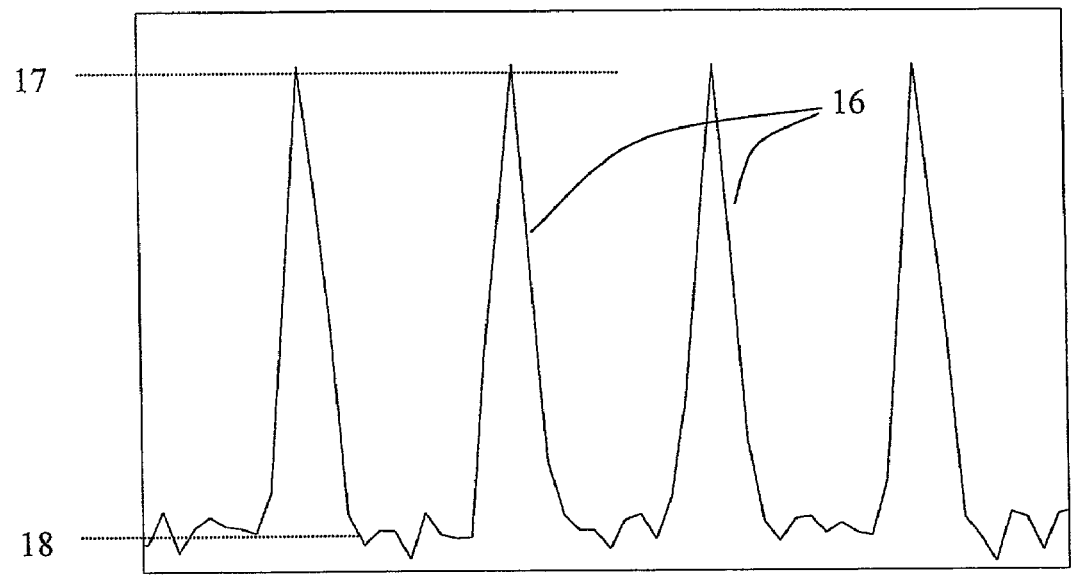
FIG. 5 is a diagrammatic illustration of the conventional method of OSNR measurement in high-density optical transmission systems.
Figure 6:
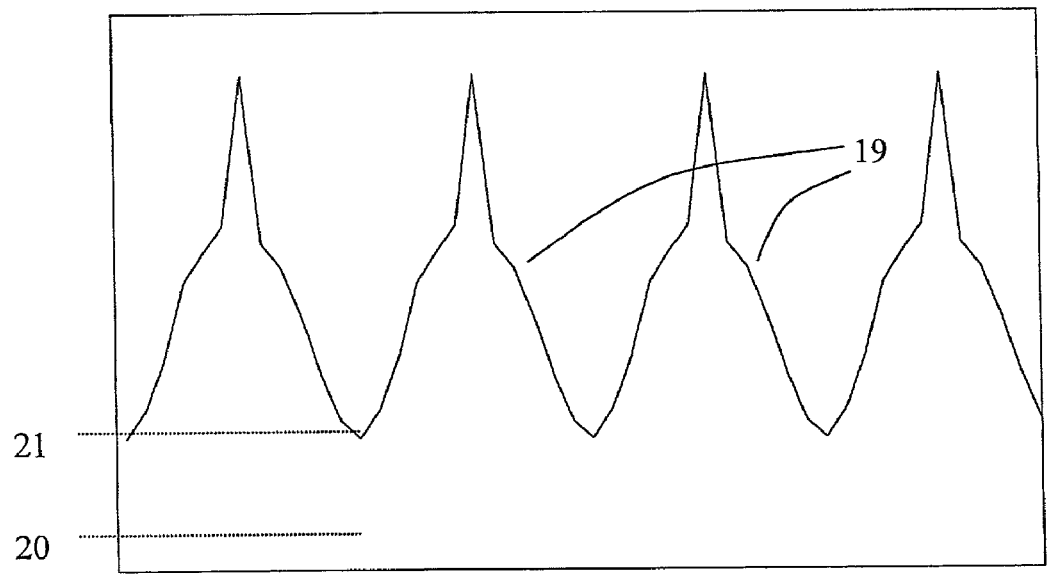
FIG. 6 represents the adverse effects of modulation side lobe overlap on OSNR measurement.

This is illustrated in FIG. 5, representing the optical spectrum of a number of closely spaced optical channels 16. In one conventional method, the Optical Signal to Noise Ratio is determined by comparing the peak signal power at a level 17 with the noise power at a trough 18, however as the optical channels are spaced more closely to increase transmission system capacity, greater demands are placed on the frequency resolution of the measuring instrument. With extremely close channels, the overlap of the modulation side lobes 19 in FIG. 6 with an adjacent channel is so great that the actual noise level 20 is below the intersection regions 21 of the side lobes, and the Optical Signal to Noise Ratio (OSNR) cannot be measured.

Figure 7:
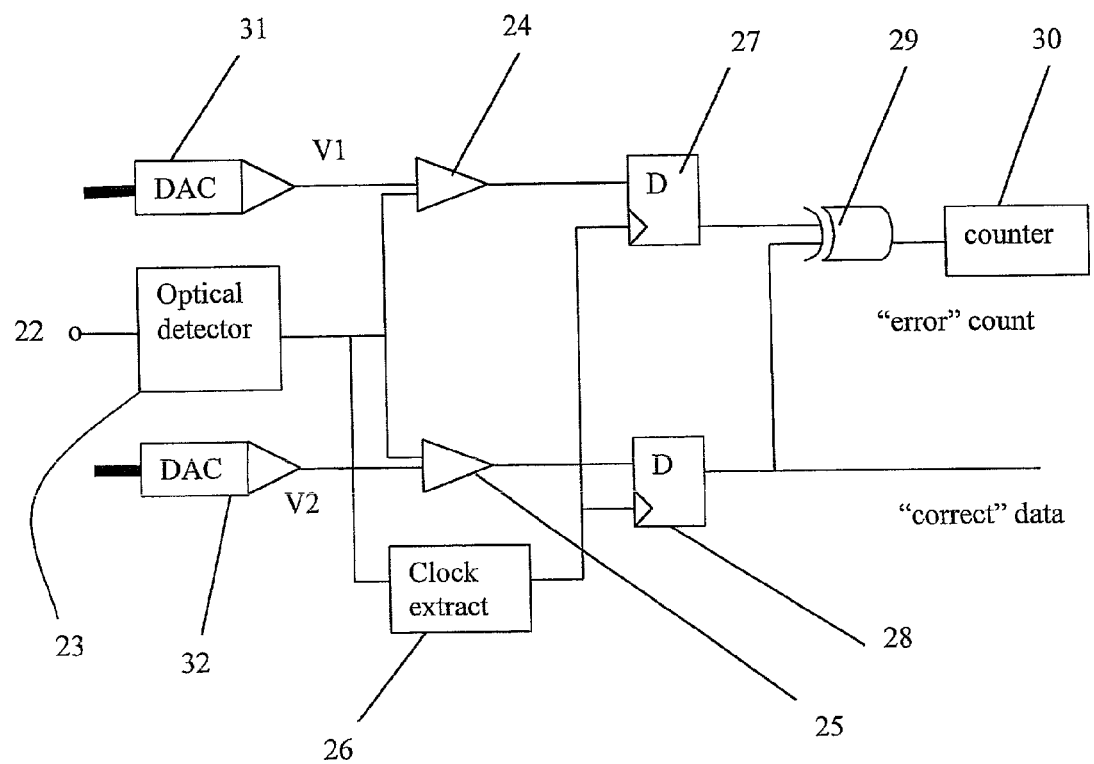
FIG. 7 is schematic diagram of an optical receiver used for implementing the invention.

An example of a suitable decoder is illustrated in FIG. 7. The received optical signal 22 is detected, eg by a photodetector 23, and output to parallel paths feeding electrical analogue comparators 24, 25 and also to a clock extractor 26 whose output clocks D-type flip-flops 27, 28. The other inputs of the comparators 24, 25 are derived from digital to analogue converters 31, 32 which are in turn controlled by a microprocessor forming part of the optical receiver such that their outputs comprise the decision thresholds of comparators 24,25 respectively. The other inputs of the flip-flops are taken from the outputs of comparators 24, 25. The flip-flop outputs are connected to an exclusive-OR gate 29 whose output is fed to an error counter 30. When the decision threshold of the lower comparator 25 is set to a value corresponding to the centre of the eye, the output of the lower flip-flop 28 constitutes the "correct" data output. The decision threshold of comparator 24 is then set to various values throughout the eye to explore the roll off of the BER.

The exclusive-OR gate 29 produces an output when the two inputs from the flip-flops 27, 28 disagree. In effect, the difference between the decisions reached by the flip-flops is examined to generate a count representative of the data bit error as determined by the decision thresholds.

Figure 8:
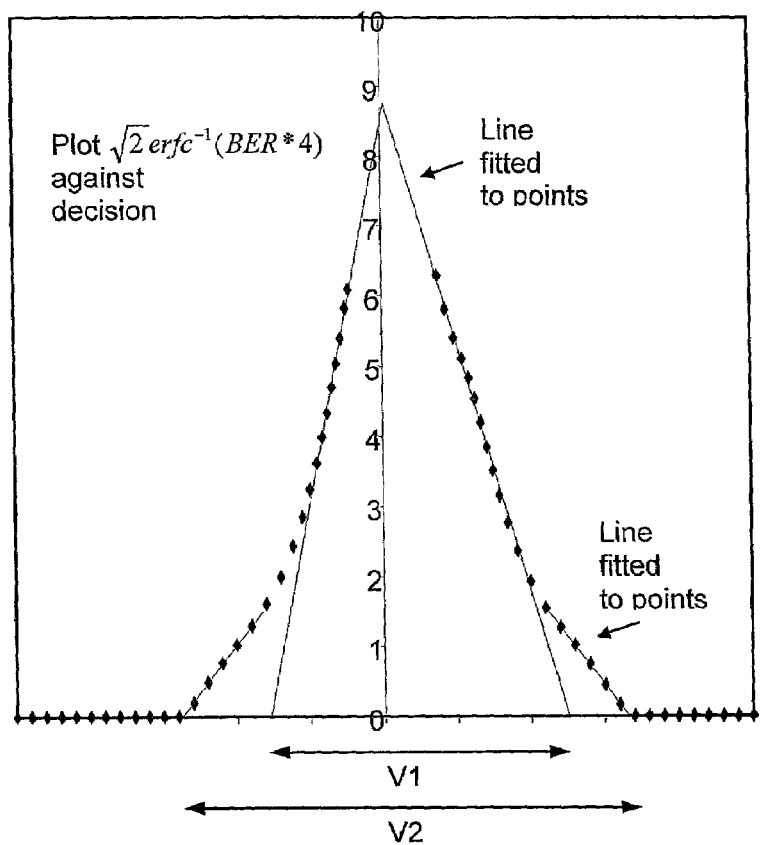
FIG. 8 illustrates the comparison between Q plots with low and high levels of noise.
Figure 8:
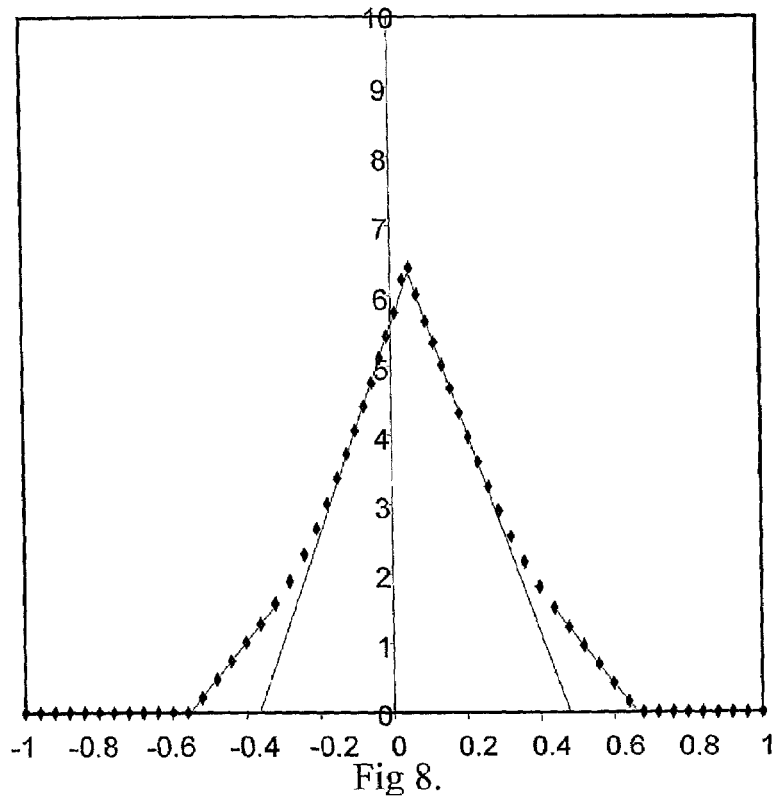

FIG. 8 illustrates, for the sake of comparison, the different Q versus threshold plots for measurements on signals affected by distortion and different amounts of noise. The upper plot represents the lower noise situation whereas the lower plot represents the higher noise situation, the former having a higher Q value where the steeper slopes intersect than the latter.

It should also be noted that the algorithm for evaluating V1, V2 and the other useful outputs derivable from the one measurement are preferably implemented in software. Suitable pseudo-code for performing the main part of the invention would be as follows:

```
decision_threshold = zero_level
measure error_ratio
while error_ratio > BER_limit
  decision_threshold = decision_threshold + step
  measure error_ratio
  [optional] Q = 2^(1/2) erfc^(-1) (4 × error_ratio)
end while
decision_threshold = one_level
measure error_ratio
while error_ratio > BER limit
  decision_threshold = decision_threshold - step
  measure error_ratio
  [optional] Q = 2^(1/2) erfc^(-1) (4 × error_ratio)
end while
For decision_threshold = zero_level
  For error ratios <0.25 AND > outer slope lower BER limit
    fit line to error ratios
  outer_zero = line intercept (error_ratio = 0.25)
  For error ratios < inner slope upper BER limit AND > error ratio minimum fit line to error ratios
  inner_zero = line intercept (error_ratio = 0.25)
End For
For decision_threshold = one_level
  For error ratios <0.25 AND > outer slope lower BER limit
    fit line to error ratios
  outer_one = line intercept (error_ratio = 0.25)
  For error ratios < inner slope upper BER limit AND > error ratio minimum fit line to error ratios
  inner_one = line intercept (error_ratio = 0.25)
End For
V1 = inner_one - inner_zero
V2 = outer_one - outer zero
Distortion Eye Closure_ratio = V1 / V2
```

It can therefore be seen that by suitable manipulation of information presented in the swept decision threshold technique, it is possible to isolate an estimate or prediction of the error component attributable to distortion alone. As a useful adjunct, the invention also makes it possible to derive information relating to the Q of the link, the bit error ratio, the eye amplitude closure ratio and the optical-signal-to-noise ratio.

What we claim is:

1. A method of measuring the amplitude distortion component in an optical transmission signal subject to noise and amplitude distortion components, the method comprising controlling by a processor to determine the amplitude distortion component by analysing the bit error ratio (BER) of the signal as a function of a movable decision threshold, wherein the analysis is performed in a high bit error ratio area of the function, away from a center of an eye, and in a low bit error ratio area closer to the centre of the eye.

2. A method as claimed in claims 1, wherein the analysis comprises the steps of:
determining BER values as a function of the position of said movable decision threshold in said high bit error ratio area and in said low bit error ratio area;
extrapolating the BER values in both the high bit error ratio area and the low bit error ratio area to obtain respective first and second decision threshold values corresponding to a predetermined value of BER in both the high bit error ratio area and the low bit error ratio area;
determining the difference V1 between said first and second decision threshold values in the low bit error ratio area;
determining the difference V2 between said first and second decision threshold values in the high bit error ratio area; and
determining the ratio V1/V2 as a measure of the amplitude distortion component of the signal.

3. A method as claimed in claim 2, wherein said predetermined value of BER is 0.25.

4. A method as claimed in claim 1, wherein said analysis is performed on values of BER after Q conversion in accordance with the function $Q=2^{1/2}\mathrm{erfc}^{-1}(4\times BER)$, in which erfc is the complementary error function.

5. A method as claimed in claim 1, further comprising the step of providing said BER values by comparing the said signal with a said variable decision threshold.

6. A method as claimed in claim 1, further comprising the steps of:
estimating a second bit error ratio by projecting BER values from said first and second decision threshold values in the high bit error ratio area and at the same gradient as said extrapolations in the lower bit error ratio area; and
determining the intersection of said projected BER values to obtain an estimated BER value, indicative of an optical signal-to-noise ratio of said optical signal.

7. A method as claimed in claim 1, performed by a programmed computer.

8. A computer programmed to perform the method of claim 1.

9. An optical transmission system comprising measuring means to measure the amplitude distortion component in an optical transmission signal subject to noise and amplitude distortion components, the measuring means adapted to measure the amplitude distortion component by analyzing the bit error ratio (BER) of the signal as a function of a movable decision threshold, wherein said measuring means is adapted to perform said analysis in a high bit error ratio area of the function, away from a center of an eye, and in a low bit error ratio area closer to the centre of the eye; and further comprising comparing means to provide said BER values by comparing the signal with a variable decision threshold.

10. An optical transmission system as claimed in claim 9, wherein said measuring means comprises:
   BER determining means to determine BER values as a function of the position of said movable decision threshold in said high bit error ratio area and in said low bit error ratio area;
   BER extrapolating means to extrapolate the BER values in both the high bit error ratio area and the low bit error ratio area to obtain respective first and second decision threshold values corresponding to a predetermined value of BER in both the high bit error ratio area and the low bit error ratio area;
   first difference determining means to determine the difference V1 between said first and second decision threshold values in the low bit error ratio area;
   second difference determining means to determine the difference V2 between said first and second decision threshold values in the high bit error ratio area; and
   dividing means to determine the ratio V1/V2 as a measure of the amplitude distortion component of the signal.

11. An optical transmission system as claimed in claim 10, wherein said predetermined value of BER is 0.25.

12. An optical transmission system as claimed in claim 9, wherein said analysis is performed on values of BER after Q conversion in accordance with the function $Q=2^{1/2}\mathrm{erfc}^{-1}(4\times \mathrm{BER})$, in which erfc is the complementary error function.

13. An optical transmission system, comprising optical receiver means to detect optical transmission signals and convert them into their electrical equivalent, clock extraction means to extract clock timing signals from the received optical signals, first and second digital-to-analogue converters providing first inputs to first and second analogue amplifiers, said optical receiver means providing second inputs to said first and second analogue amplifiers, first and second bi-stable circuit means connected respectively to outputs of said first and second analogue amplifiers and synchronised by said extracted clock signals, outputs of said bi-stable circuit means connected to inputs of an exclusive-OR gate, an output of said exclusive-OR gate providing error signals input to a counter, whereby said counter accumulates a count representing the bit error ratio in said received optical signals, and said digital-to-analogue converters being controlled by processor means to determine decision threshold separations V1 and V2 in the eye that represent amplitude distortion components in said received optical signals.

14. An optical receiver comprising detector means to detect optical signals from an optical transmission system and convert them into their electrical equivalent, the receiver comprising measuring means to measure the amplitude distortion component in a said optical signal subject to noise and amplitude distortion components, the measuring means adapted to measure the amplitude distortion component by analysis of the bit error ratio (BER) of the signal as a function of a movable decision threshold, wherein said measuring means is adapted to perform said analysis in a high bit error ratio area of the function, away from a center of an eye, and in a low bit error ratio area closer to the centre of the eye.

15. An optical receiver as claimed in claim 14, wherein said measuring means comprises:
   BER determining means to determine BER values as a function of the position of said movable decision threshold in said high bit error ratio area and in said low bit error ratio area;
   BER extrapolating means to extrapolate the BER values in both the high bit error ratio area and the low bit error ratio area to obtain respective first and second decision threshold values corresponding to a predetermined value of BER in both the high bit error ratio area and the low bit error ratio area;
   first difference determining means to determine the difference V1 between said first and second decision threshold values in the low bit error ratio area;
   second difference determining means to determine the difference V2 between said first and second decision threshold values in the high bit error ratio area; and
   dividing means to determine the ratio V1/V2 as a measure of the amplitude distortion component of the signal.

16. An optical receiver as claimed in claim 15, wherein said predetermined value of BER is 0.25.

17. An optical receiver as claimed in claim 14, wherein said analysis is performed on values of BER after Q conversion in accordance with the function: $Q=2^{1/2}\mathrm{erfc}^{-1}(4\times \mathrm{BER})$, in which erfc is the complementary error function.

18. An optical receiver as claimed in claim 14, further comprising comparing means to provide said BER values by comparing the said signal with a said variable decision threshold.

19. An optical receiver comprising detector means to detect optical signals from an optical transmission system and convert them into their electrical equivalent, clock extraction means to extract clock timing signals from the received optical signals, first and second digital-to-analogue converters providing first inputs to first and second analogue amplifiers, said optical receiver means providing second inputs to said first and second analogue amplifiers, first and second bi-stable circuit means connected respectively to outputs of said first and second analogue amplifiers and synchronised by said extracted clock signals, outputs of said bi-stable circuit means connected to inputs of an exclusive-OR gate, an output of said exclusive-OR gate providing error signals input to a counter, whereby said counter accumulates a count representing the bit error ratio in said received optical signals, and said digital-to-analogue converters being controlled by processor means to determine decision threshold separations V1 and V2 in the eye that represent amplitude distortion components in said received optical signals.

* * * * *